United States Patent [19]
Varadi et al.

[11] 3,782,174
[45] Jan. 1, 1974

[54] ADJUSTABLE VISCOSIMETER

[76] Inventors: Joseph Varadi, 8655 S.W. 89th Ave., Portland, Oreg. 97223; Thomas C. Easton, 13069 S.W. 63rd Ave., Portland, Oreg. 97219

[22] Filed: Aug. 9, 1971

[21] Appl. No.: 170,148

[52] U.S. Cl. ................................................. 73/57
[51] Int. Cl. ......................................... G01n 11/06
[58] Field of Search ................................. 73/57, 209

[56] References Cited
UNITED STATES PATENTS

| | | | |
|---|---|---|---|
| 2,955,459 | 10/1960 | Cihelka et al. | 73/57 |
| 2,778,220 | 1/1957 | Kuhlmann et al. | 73/57 |
| 2,252,572 | 8/1941 | Lang | 73/57 |
| 2,782,629 | 2/1957 | Norcross | 73/57 |
| 3,304,765 | 2/1967 | Norcross | 73/57 |

FOREIGN PATENTS OR APPLICATIONS

| | | | |
|---|---|---|---|
| 789,354 | 1/1958 | Great Britain | 73/57 |

*Primary Examiner*—Richard C. Queisser
*Assistant Examiner*—Joseph W. Roskos
*Attorney*—Daniel P. Chernoff et al.

[57] ABSTRACT

A falling body viscosimeter suitable for measuring and continually monitoring the viscosity of any of a variety of fluids having widely divergent viscosities. A constant speed electric motor drives a cam which alternately elevates and releases a droppable piston within a tubular housing immersed in the particular fluid to be monitored. As the piston is elevated it draws a sample of fluid inside the housing through a check valve. When the piston is released it travels downwardly through the fluid by force of gravity while the fluid is simultaneously displaced upwardly through an orifice in the piston. A timing cam also driven by the constant speed electric motor actuates a switch at a predetermined time interval after the release of the piston, thus establishing a reference time interval. A second switch senses the point in time when the piston has travelled a predetermined distance through the fluid, and an electrical circuit coupled with the two switches generates a signal equal in duration to the difference in the two times. The degree of restriction of the orifice in the falling piston is adjustable by means of a micrometer which varies the size of the orifice. This allows standardization of the time period required for the piston to fall through any fluid within a wide range of viscosities, irrespective of the viscosity.

29 Claims, 5 Drawing Figures

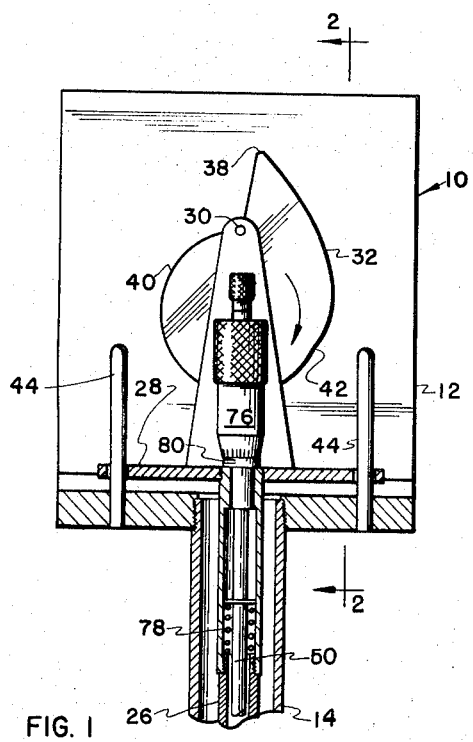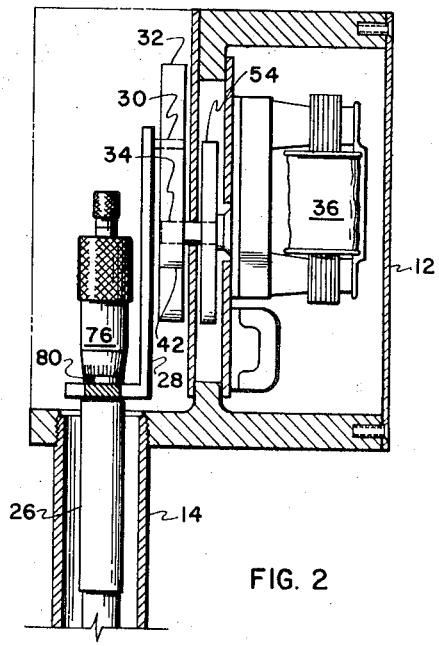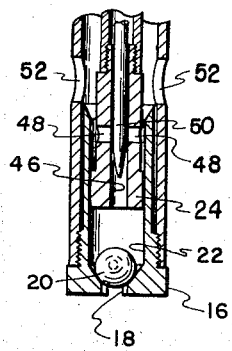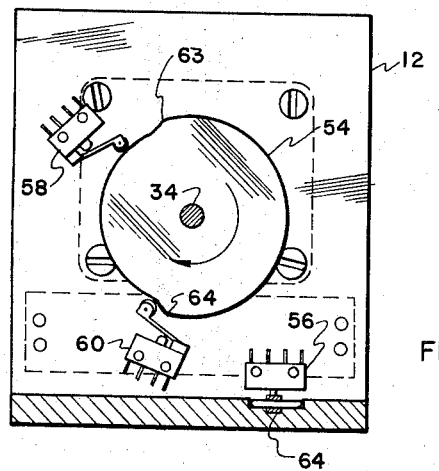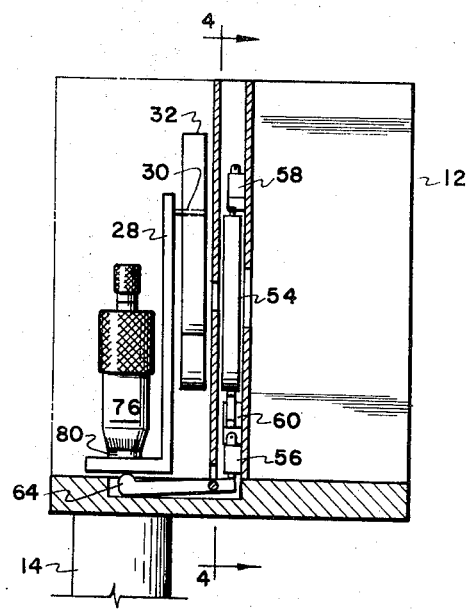
FIG. 1
FIG. 2
FIG. 4
FIG. 3

ADJUSTABLE VISCOSIMETER

BACKGROUND OF THE INVENTION

This invention relates to improvements in viscosimeters for sensing and controlling the viscosity of fluids used for commercial and industrial purposes. More specifically, the viscosimeter is of the type wherein a falling body is released into a sample of the fluid being monitored, and the viscosity measurement is based on the speed of the body as it falls through the fluid.

In viscosimeters of the type known to the art and shown for example in Norcross U.S. Pat. Nos. 2,491,389 and 2,630,819, and Cihelka U.S. Pat. No. 2,955,459 the viscosity of a fluid is monitored in response to the time required for a body to fall a predetermined distance through successive samples of the fluid. Either the time of fall is measured directly and its duration indicated as in the Norcross patents, or the time of fall is compared to a reference time interval and the difference indicated as in the Cihelka patent. Any discrepancy of the actual fluid viscosity from that which is desired is indicated by a signal which can be coupled with means for correcting the viscosity, such as by altering the temperature of the fluid or by adding thinners or thickeners to the fluid as required.

The primary drawback of the above described devices, and other similar devices known to the art, is that they are severely limited with respect to the viscosity range of fluids with which they may be used. If the fluid to be monitored is exceptionally thick, the droppable member 36 of the two Norcross patents or the metal ball 5 of the Cihelka patent will of necessity fall very slowly through such thick fluids. The time required for such falling bodies to complete one traverse of a particular sample of the fluid may in fact exceed the limits of their respective indicator systems. For example the time required may exceed the mechanical limits of the pen indicating mechanism of the Norcross patents, or the time may so exceed the comparative time standard of the Cihelka patent that any comparison becomes inaccurate or meaningless. A similar problem would be encountered when these devices are used to monitor the viscosities of exceptionally thin fluids.

In addition, since these prior art devices are intended for continual monitoring of viscous fluids, any inordinately long time period required to measure a single sample of a thick fluid would severly limit the number of samples which could feasibly be measured in a given period of time. This in itself would decrease the effectiveness and accuracy of the monitoring systems, even if the indicator or timing mechanisms could be so constructed as to be highly adjustable.

Accordingly, a great need exists for a viscosimeter which is adaptable for effective and accurate monitoring of any fluid within a widely divergent range of viscosities. Moreover it is desirable that such device be considerably simpler in construction and less expensive to manufacture than the devices of the prior art which have more limited capabilities.

SUMMARY OF THE PRESENT INVENTION

The present invention is directed to an adjustable viscosimeter for sensing the viscosities of any of a variety of viscous fluids which fall within a widely divergent range of viscosities. A droppable piston is coupled with means for periodically elevating and releasing the piston in successive samples of the fluid to be monitored.

The elevating and releasing means includes a constant speed electric motor which, because of its constant speed, can be utilized also as a driver for a timing device which senses the time period for the piston to travel a predetermined distance through each fluid sample. The timer comprises a cam driven by the motor and a sensor switch for engaging the cam and registering the point after each drop of the body when a predetermined reference time interval ends. A second sensor switch indicates the point in time when the body has travelled the predetermined distance through the fluid. An electrical circuit coupled with both sensors compares the two times and generates a signal equal in duration to the difference between them. Indicator lights responsive to the signal generate light signals equal in duration to the difference in time. Also, means responsive to the signal can be provided to correct any discrepancy in the viscosity.

The piston is situated inside a tubular housing which is immersed in the fluid to be monitored. Each time the piston is raised a sample of the fluid is drawn into the housing through a check valve in the bottom of the housing. As soon as the piston is released the check valve closes and restrains the fluid from moving in the same direction as the piston. The fit of the piston in the tubular housing is such that none of the fluid may leak upward around the piston as it falls. Rather the piston has an internal orifice through which the fluid is displaced upwardly as the piston descends. The orifice is adjustable as to size by means of a tapered rod inserted into the orifice which can be retracted or extended in infinite degrees by a micrometer adjustment. Such adjustment alters the flow impeding characteristics of the orifice and thereby alters the speed at which the piston can drop through the fluid sample. In practice this speed can be standardized for any fluid having a viscosity falling within a widely divergent range of viscosities. This allows the time required for the piston to fall a predetermined distance through the fluid to be adjusted so that it is equal to the reference time interval established by the timer. At such adjustment, the viscosity of the liquid can be read from the micrometer scale in conjunction with appropriate calibration.

The provision of means for adjusting the flow impeding characteristics of the orifice in the piston and thereby adjusting the speed at which the piston travels through the fluid provides the viscosimeter of the present invention with several important advantages. Of primary importance is the fact that the viscosimeter is adaptable for accurate monitoring of a wide variety of viscous fluids, ranging from exceptionally thin to exceptionally thick fluids. Moreover, with the thicker fluids, the rate at which samples can be successively introduced to the viscosimeter is not decreased since the speed of the measuring device, unlike conventional devices, need not be decreased, and therefore effective and accurate continual monitoring is not hindered. In addition, the adjustment in actual speed of the falling piston allows the use of a simple and inexpensive timing device which need only establish a fixed reference time for comparison purposes regardless of whether the fluid being monitored is thin or thick. Because the timing device is so simple, it is possible to drive it with the same prime mover which elevates and releases the piston, which adds significantly to the economic manufacture of the device.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is an extended, partially sectional front view of the viscosimeter.

FIG. 2 is a partial sectional view taken along line 2—2 of FIG. 1.

FIG. 3 is a side sectional view of the viscosimeter showing switch details with other parts removed for clarity.

FIG. 4 is a partial front view taken along line 4—4 of FIG. 3.

DESCRIPTION OF THE PREFERRED EMBODIMENT

Figure 5:
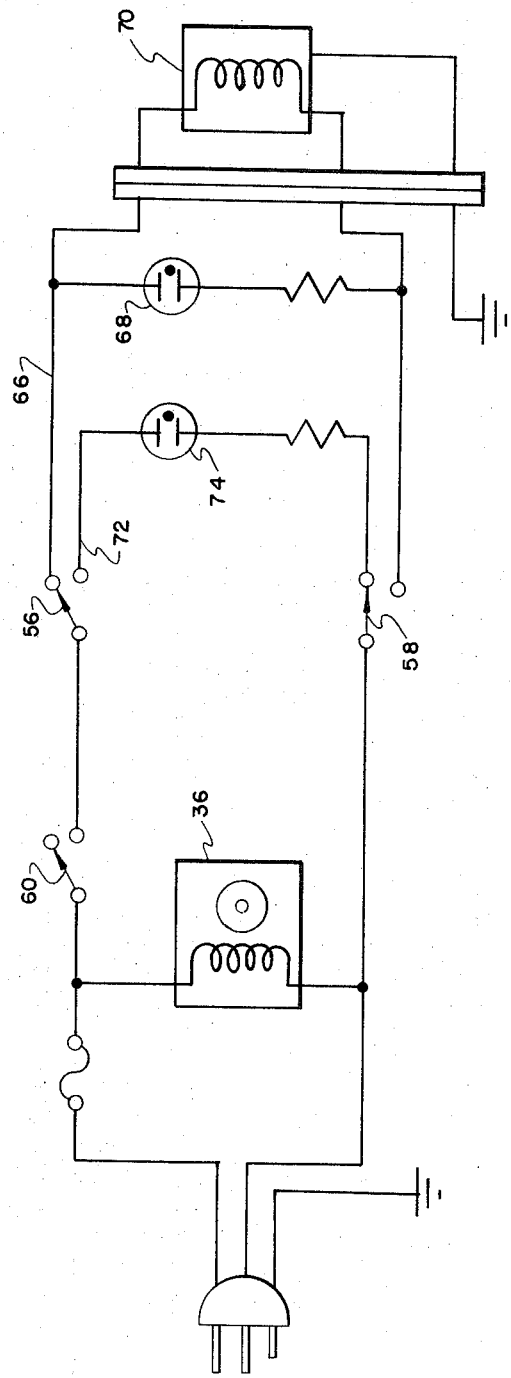
FIG. 5 is a schematic diagram of the electrical comparing circuit of the viscosimeter.

The viscosimeter, designated generally as 10 in FIG. 1, comprises a head portion 12 having a tubular housing 14 suspended therefrom. Tubular housing 14 has a fitting 16 threaded into its bottom end. The fitting 16 includes a port 18 and a ball check valve 20 for allowing fluid to flow into the interior of fitting 16 but preventing its exit from the fitting. The fitting 16 also has a precisely machined inner sleeve portion 22 for accepting a similarly machined sliding piston 24. The diameter of piston 24 is such that the piston may slide freely within fitting 16 without allowing leakage between the piston and the interior sleeve portion 22 of the fitting.

The piston 24 is connected by means of a hollow piston rod 26 to a bracket 28 at the top of the piston rod. The bracket 28 includes a cam follower 30 which is engaged by an elevating and releasing cam 32 rotatably driven through a drive shaft 34 by a constant speed electric gear motor 36, best seen in FIG. 2. Rotation of cam 32 is clockwise as shown in FIG. 1, and the cam preferably rotates at one revolution per minute.

As cam 32 rotates through one cycle it gradually raises bracket 28, piston rod 26, and piston 24 through its engagement with cam follower 30. When the releasing point 38 on cam 32 raches reaches cam follower 30, piston 24 is allowed to fall downwardly by force of gravity until it is halted by abutment of bracket 28 with switch lever 64 (FIG. 3). Thereafter piston 24 remains motionless until cam 32 has rotated sufficiently that cam follower 30 engages the elevating point 42 on cam 32 and piston 24 is once more raised gradually upward.

During the elevation and release of piston 24, its alignment within fitting 16 is maintained by a pair of guide rods 44 which are slideably engaged by bracket 28.

In operation, the tubular housing 14 is immersed in a stream or reservoir of the particular viscous fluid to be monitored. On each elevation of piston 24, a sample of the fluid is drawn inside fitting 16 through port 18 and check valve 20. When piston 24 is released by cam 32 check valve 20 closes, preventing any fluid from escaping through port 18.

Piston 24 is provided with an orifice 46 which communicates through the interior of the piston with outlet ports 48. In the center of the orifice is a loosely fitting tapered rod 50 which is used to adjust the size of the orifice for purposes to be described hereafter. The orifice 46 therefore comprises the annular space between the interior surface of piston 24 and the exterior surface of rod 50 below outlet ports 48.

As the piston 24 falls by force of gravity after being released by cam 32, the fluid trapped between the piston and check valve 20 is forced upwardly through orifice 46 and outlet ports 48. The fluid returns to the larger body of fluid from which the sample was initially taken through ports 52 situated in tubular housing 14.

The speed at which the piston 24 falls through the fluid or, to put it another way, the rate at which the fluid flows through the orifice 46, is inversely proportional to the actual viscosity of the fluid being monitored. The viscosimeter senses this speed or flow rate by sensing the actual period of time for the piston 24 to fall a predetermined distance through the fluid sample trapped inside the fitting 16. (Obviously such time period also corresponds to the time required for a fixed quantity of the fluid to flow through orifice 46.) The timer provided for sensing this time period comprises a switch 56 for sensing the point in time when the piston actually completes its travel through the predetermined distance, and a timing cam 54 in engagement with a cam follower switch 58 for establishing a reference time interval against which to compare the actual time period.

The function of the timer is probably best explained by describing the sequence of events which occur through one complete measuring cycle of the viscosimeter. For purposes of this discussion, reference should be made particularly to FIGS. 3, 4 and 5. For convenience the cycle will be considered to begin at the point where cam 32 releases piston 24. At approximately this same time, cam 54 which is fixed to shaft 34 and driven by the same constant speed motor 36 which also drives elevating and releasing cam 32, allows spring-biased cam follower switch 58 to spring into its open position as shown both in FIG. 4 and FIG. 5. As cam 54 continues to rotate, its lobe 64 closes the main power switch 60 of the comparing circuit to FIG. 5. Meanwhile, switch 56 has been in its spring-biased open position as shown in FIG. 5 due to the fact that bracket 28 (FIG. 3) has been in its elevated position and has therefore not been pressing against lever 64 which closes switch 56. Because of the frictional drag imposed against the movement of piston 24 by the fluid attempting to pass through orifice 46, it takes a period of time after its release for piston 24 to fall through the distance required for bracket 28 to close switch 56. Meanwhile lobe 64 of cam 54 is approaching switch 58 and, because motor 36 is a constant speed motor, will close switch 58 at a fixed time interval after cam 32 has released piston 24.

Three alternative events can occur. One alternative is that lobe 64 may close switch 58 before piston 24 can drop far enough to close switch 56. In such case circuit 66 in FIG. 5 will be completed for a duration equal to the time period by which the closure of switch 56 lags behind the closure of switch 58. Moreover indicator light 68 will glow and solenoid valve 70 will be opened, for purposes to be described hereafter, for that duration of time.

Another alternative is that piston 24 will fall fast enough that switch 56 is closed before switch 58 is closed. In this case circuit 72 and indicator light 74 will be energized for the duration by which the closure of switch 58 lags behind the closure of switch 56.

A third alternative is that switches 56 and 58 will be closed at precisely the same time, in which case neither circuit 66 nor 72 will be energized.

When both switches 56 and 58 have finally been closed, switch 58 will stay closed until approximately the time when piston 24 is released again and lobe 63 of cam 54 allows switch 58 to open. Before lobe 63 reaches switch 58, however, it first allows main power switch 60 to open, thus cutting power to the entire comparing circuit of FIG. 5. The opening of main power switch 60 must occur at a point in the cycle before cam 32 begins to raise piston 24. This is necessary because the raising of piston 24 opens switch 56 which, because switch 58 is still closed, would otherwise complete circuit 66 and give a false viscosity indication when actually no viscosity measurement is taking place. Shortly after lobe 63 allows switch 58 to open at the beginning of the cycle, lobe 64 closes switch 60 and the cycle repeats itself.

The three alternative results obtainable from the comparing circuit of FIG. 5 act as indicators of the actual viscosity of the fluid being monitored. The reference time interval, established by timing cam 54 and cam follower switch 58 between the point of release of piston 24 and the point when lobe 64 closes switch 58, corresponds to the time required for the piston to drop the predetermined distance from point of release to closure of switch 56 through a fluid of a known reference viscosity. If samples of the fluid being monitored impede the progress of piston 24 sufficiently that the closure of switch 56 lags behind the closure of switch 58, then the signal generated by the completion of circuit 66 indicates that the fluid is thicker or more viscous than the reference viscosity. Moreover the duration of the signal generated by the completion of circuit 66, and thus the duration that indicator light 68 is energized, is indicative of the magnitude of the discrepancy in viscosity. On the other hand, if circuit 72 is energized, this indicates that the fluid is less viscous than the reference viscosity, and the duration that indicator light 74 is energized indicates the magnitude of the discrepancy.

Although in the preferred embodiment of the invention signals are utilized in circuits 66 and 72 respectively of durations proportional to the discrepancy in viscosities, modifications in the circuitry could readily produce signals proportional in amplitude, rather than duration, to the discrepancy in viscosity and be equally useful.

Solenoid valve 70 in circuit 66 is illustrative of one of a variety of controlling means which can be utilized in conjunction with the viscosimeter to correct discrepancies in the viscosity of the fluid being monitored. For example, assuming that the reference viscosity is the desired viscosity for the fluid, a signal in circuit 66 would indicate that the fluid is too thick. Solenoid valve 70 would therefore control the addition of a thinning agent to the fluid, and since valve 70 would stay open only for a duration proportional to the discrepancy in viscosities, the amount of thinner added to the fluid would also be proportional to the magnitude of the discrepancy. Similar valve means controlling the addition of thickeners could be coupled with circuit 72. Moreover if the temperature of the fluid under control were not vital, its viscosity could also be adjusted by heater means connected to circuit 66 or cooling means connected to circuit 72 respectively.

As explained above, the reference viscosity established by the viscosimeter is the viscosity which provides coincidence between the actual time period required for the piston 24 to travel from its point of release to the point of closure of switch 56, and the time between point of release and closure of switch 58 by lobe 64 of timing cam 54. Clearly, for any given configuration of piston 24, there is only one such reference viscosity. However piston 24 is provided with means for varying its physical configuration by adjusting orifice 46 and thereby altering its flow impeding characteristics. The adjustment is accomplished by means of a tapered rod 50 which is coupled with a micrometer 76 mounted on bracket 28. By twisting the micrometer 76 in one direction or the other, rod 50 can be extended or retracted by infinite degrees. A spring 78 inside piston rod 26 is utilized to help retract rod 50. By extending the rod, the annular cross-sectional size of orifice 46 is decreased and its flow impeding characteristics are increased. Thus the frictional drag of the fluid on the piston and the time necessary for the piston to traverse the fluid is also increased. Conversely, retraction of the rod 50 increases the annular size of the orifice and decreases its flow impeding characteristics. Therefore the frictional drag of the fluid on the piston is also decreased and the speed of the piston through the fluid is increased. The tapered end of the rod 50 is preferably of a substantially parabolic or "bullet-nosed" configuration to improve the linearity of the orifice adjustment.

One of the uses for the adjusting mechanism described above is to measure the actual viscosity of a particular fluid. The viscosimeter is initially calibrated by the manufacturer by using a prototype viscosimeter to sample a large variety of fluids of known viscosities. For each such fluid, the micrometer 76 is adjusted so that the closures of switches 56 and 58 are coincidental, and the reading on the micrometer scale 80 corresponding to the known viscosity is recorded. Calibration tables or curves showing the relationship between actual viscosity and micrometer scale readings allow direct viscosity measurement of any fluid when the closures of switches 56 and 58 are coincidental, as indicated by the absence of a signal from either of the two indicator lights 68 or 74 respectively.

If viscosity control rather than viscosity measurement is desired, micrometer 76 can be set to the point on its scale corresponding to the desired reference viscosity, and periodic sampling and control of the fluid through the comparing circuitry can be accomplished as explained above. If the absolute value of the desired viscosity is not known, but a sample having the desired viscosity is available, the viscosimeter can be set for the reference viscosity of the sample by adjusting the micrometer until coincidence of switches 56 and 58 is achieved, and then the viscosimeter can be left in that adjustment while it continually samples and monitors the fluid.

As is readily apparent from the above discussion, the actual period of time required for the piston to fall through the fluid is always adjusted to correspond conveniently with the pre-set timer of the viscosimeter. Besides making the viscosimeter highly adaptable for use in a wide range of viscosities, this feature allows the rate of periodic sampling to be maintained regardless of viscosity, and allows use of a simple, inexpensive timing device which need not be adjustable. These benefits are far more advantageous than any which might be obtained by adjusting the timing means to correspond with the actual time period.

It will be apparent to those skilled in the art that devices other than the orifice adjusting mechanism disclosed herein might be used to adjust the actual time period for the piston to fall through fluids of varying viscosities. For example an orifice adjustable primarily with respect to length rather than cross section, or restricting means other than an orifice such as adjustable vanes or other flow impeding surface configurations, might be utilized on a free falling body of any shape to vary the frictional drag of the fluid on the body. Moreover the adjustable orifice or other flow impeding means need not necessarily be located on the falling or moving body, but may instead have a fixed location and have the fluid placed in motion with respect to it. For example the adjustable orifice could be a part of fitting 16, and a falling piston without an orifice might push successive fluid samples through the orifice.

All of the above described alternative adjustment methods are within the scope and intent of the present invention, although the embodiment shown is considered to be the most advantageous from the standpoints of economy and accuracy, and with respect to achieving the widest range of viscosities for which the device is suitable.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for sensing the viscosity of a fluid comprising:
   a. a body for contacting said fluid;
   b. means for placing said body and said fluid in relative motion with one another;
   c. sensor means for sensing the relative speed between said body and said fluid; and
   d. adjusting means coupled with said body for adjusting the physical configuration of at least a portion of said body in contact with said fluid to a predetermined configuration independent of the force producing said relative motion and independent of the temperature of said fluid, so as to alter the frictional drag of said fluid with respect to said body and thereby adjust the relative speed between said body and said fluid to a speed convenient for sensing with said sensor means.

2. The device of claim 1 wherein said adjusting means includes threaded means coupled with said body for altering by infinite degrees said physical configuration of said movable body.

3. The device of claim 1 wherein said body comprises at least a portion of an adjustable orifice through which said fluid passes as said body and fluid move relative to one another.

4. The device of claim 3 wherein said adjusting means includes means for altering the size of said adjustable orifice.

5. The device of claim 1 including means for periodically introducing successive samples of said fluid into contact with said body for periodic viscosity measurements of said fluid.

6. The device of claim 5 wherein said adjusting means includes means for adjusting said relative speed between said body and said fluid so that the time period necessary for said body and a given sample of said fluid to complete a traverse with respect to each other is less than the time interval between introduction of said successive fluid samples.

7. The device of claim 1 including means for moving said body in a direction and means for restraining said fluid against movement in said direction to produce said relative motion between said body and said fluid.

8. The device of claim 7 including means for alternately elevating and releasing said body to allow it to drop by force of gravity through said fluid.

9. A device for sensing the viscosity of a fluid comprising:
   a. restricting means for impeding the flow of said fluid;
   b. means for forcing a fixed quantity of said fluid through said restricting means;
   c. timer means for sensing the actual time period required for said fixed quantity of fluid to flow through said restricting means; and
   d. adjusting means for adjusting, independently of the physical characteristics of said fluid, said actual time period to a predetermined time period which is convenient for sensing with said timer means, said adjusting means comprising means coupled with said restricting means for altering the physical configuration and thereby the flow impeding characteristics of said restricting means.

10. The device of claim 9 wherein said restricting means comprises an orifice and said adjusting means comprises means for altering the size of said orifice.

11. The device of claim 9 wherein said adjusting means comprises threaded means for altering by infinite degrees said physical configuration of said restricting means.

12. The device of claim 9 wherein said timer means includes means for establishing a reference time interval, and further includes means for comparing said actual time period with said reference time interval.

13. The device of claim 12 wherein said adjusting means includes means for adjusting said actual time period to equal said reference time interval.

14. The device of claim 12 including signal means coupled with said timer means for producing a signal proportional in magnitude to the difference in time between said actual time period and said reference time interval.

15. The device of claim 14 wherein said signal means includes means for producing a signal proportional in duration to said difference in time.

16. The device of claim 15 including indicator light means responsive to said signal for generating a light signal proportional in duration to said difference in time.

17. The device of claim 14 including means responsive to said signal for adding a quantity of thinner to said fluid proportional to said difference in time when said actual time period exceeds said reference time interval.

18. The device of claim 9 including means for periodically forcing successive fixed quantities of said liquid through said restricting means at successive time intervals, said adjusting means including means for adjusting said actual time period to a period smaller than each of said successive time interval.

19. A device for sensing the viscosity of a fluid comprising:
   a. a droppable body for traversing said fluid;
   b. elevating and releasing means for periodically dropping said body into said fluid;
   c. timer means drivingly coupled to said elevating and releasing means and driven at a speed proportional to the speed of said elevating and releasing means for establishing a reference time interval; and
   d. means for sensing the actual time period for said droppable body to traverse a predetermined distance through said fluid and for comparing said actual time period with said reference time interval.

20. The device of claim 19 wherein said elevating and releasing means comprises a constant speed motor.

21. The device of claim 20 wherein said timer means comprises a cam driven by said constant speed motor and a cam follower sensor for engaging said cam and registering the point after each drop of said body when a predetermined reference time interval ends.

22. The device of claim 21 wherein said timer means includes a second sensor responsive to the position of said droppable body for indicating the point in time when said body completes said traverse of said fluid.

23. The device of claim 22 including signal means coupled with said first and second sensors for generating a signal proportional in magnitude to the difference in time between the end of said reference time interval and the completion of said droppable body's traverse of said fluid.

24. The device of claim 23 wherein said signal means includes means for generating a signal proportional in duration to said difference in time.

25. A falling body viscosimeter for sensing the viscosity of a fluid comprising:
   a. means for alternately elevating and releasing said body to allow it to drop by force of gravity a predetermined distance through said fluid;
   b. timer means for establishing a reference time interval, sensing the actual time period of said body to drop said predetermined distance through said fluid, and comparing said actual time period from said reference time interval; and
   c. adjusting means coupled with said body for adjusting, independently of the physical characteristics of said fluid, said actual time period to a time period which is equal to said reference tine intrval, said adjusting means comprising means coupled with said body for altering the physical configuration of at least a portion of said body to thereby alter the frictional drag of said fluid thereon.

26. The device of claim 25 wherein said timer means is drivingly coupled with said means for alternately elevating and releasing said body.

27. A falling body viscosimeter for sensing the viscosity of a fluid comprising:
   a. a tubular housing containing a droppable piston;
   b. a cam driven by a constant speed motor for engaging a cam follower coupled with said piston to alternately elevate said piston and allow it to drop by force of gravity a predetermined distance within said tubular housing;
   c. a port in said tubular housing for allowing a sample of said fluid to be drawn into said housing below said piston during each elevation of said piston;
   d. an orifice in said piston for allowing the escape of said fluid sample through said orifice during the descent of said piston;
   e. a timing cam driven by said constant speed motor for engaging a cam follower switch at a predetermined reference time interval after each release of said piston;
   f. a switch responsive to the position of said piston for sensing the actual time period for said piston to drop said predetermined distance;
   g. circuit means coupled with said two switches for comparing said actual time period with said reference time interval and generating a signal equal in duration to the difference between them; and
   h. adjusting means coupled with said orifice in said piston for altering the size of said orifice to adjust said actual time period required for said piston to drop said predetermined distance through said fluid to a time period which is equal to said reference time interval.

28. A device for sensing the viscosity of a fluid comprising:
   a. a body for contacting said fluid;
   b. means for placing said body and said fluid in relative motion with one another;
   c. sensor means for sensing the relative speed between said body and said fluid; and
   d. adjusting means coupled with said body for altering the physical configuration of at least a portion of said body in contact with said fluid to alter the frictional drag of said fluid with respect to said body and thereby adjust the relative speed between said body and said fluid to a speed convenient for sensing with said sensor means, said adjusting means including a scale for indicating the degree of said adjustment.

29. A device for sensing the viscosity of a fluid comprising:
   a. restricting means for impeding the flow of said fluid;
   g. means for forcing a fixed quantity of said fluid through said restricting means;
   c. timer means for sensing the actual time period required for said fixed quantity of fluid to flow through said restricting means, said timer means including means for establishing a reference time interval and further including means for comparing said actual time period with said reference time interval; and
   d. adjusting means for adjusting said actual time period to equal said reference time interval, said adjusting means including a scale for indicating the actual viscosity of said fluid when said actual time period equals said reference time interval.

* * * * *

UNITED STATES PATENT OFFICE
CERTIFICATE OF CORRECTION

Patent No. 3,782,174  Dated January 1, 1974

Inventor(s) Joseph Varadi and Thomas C. Easton

It is certified that error appears in the above-identified patent and that said Letters Patent are hereby corrected as shown below:

| | | |
|---|---|---|
| Col. 3, | Line 46 | Delete "raches"; |
| | Line 46 | After "reaches" insert --the--. |
| Col. 4, | Line 41 | Change "to" to --of--. |
| Col. 9, | Line 2 | Delete "of". |
| | Line 51 | Change "tine intrval" to --time interval--. |

Signed and sealed this 11th day of June 1974.

(SEAL)
Attest:

EDWARD M. FLETCHER, JR.
Attesting Officer

C. MARSHALL DANN
Commissioner of Patents